United States Patent
Szczepanski (10) Patent No.: US 11,268,416 B2
(45) Date of Patent: Mar. 8, 2022

(54) METHODS AND SYSTEMS FOR DETECTING AN IMPEDANCE OF A CATALYTIC CONVERTER

(71) Applicant: DENSO International America, Inc., Southfield, MI (US)

(72) Inventor: Edward Szczepanski, Grosse Pointe Farms, MI (US)

(73) Assignee: DENSO INTERNATIONAL AMERICA, INC., Southfield, MI (US)

(*) Notice: Subject to any disclaimer, the term of this patent is extended or adjusted under 35 U.S.C. 154(b) by 0 days.

(21) Appl. No.: 16/877,692

(22) Filed: May 19, 2020

(65) Prior Publication Data

US 2021/0363905 A1 Nov. 25, 2021

(51) Int. Cl.
*F01N 3/00* (2006.01)
*F01N 3/20* (2006.01)
*F01N 11/00* (2006.01)

(52) U.S. Cl.
CPC .......... *F01N 3/2013* (2013.01); *F01N 11/002* (2013.01); *F01N 11/007* (2013.01); *F01N 2230/04* (2013.01); *F01N 2240/16* (2013.01); *F01N 2550/22* (2013.01); *F01N 2560/025* (2013.01); *F01N 2560/06* (2013.01); *F01N 2900/0602* (2013.01); *F01N 2900/1602* (2013.01); *F01N 2900/1624* (2013.01)

(58) Field of Classification Search
CPC .... F01N 3/2013; F01N 11/007; F01N 11/002; F01N 2900/1602; F01N 2550/22; F01N 2900/0602; F01N 2900/1624; F01N 2240/16; F01N 2560/025
See application file for complete search history.

(56) References Cited

U.S. PATENT DOCUMENTS

| | | | |
|---|---|---|---|
| 5,630,315 A | 5/1997 | Theis | |
| 6,240,722 B1* | 6/2001 | Busch | F01N 3/0842 60/277 |
| 7,950,221 B2* | 5/2011 | Stancovski | B01D 53/944 60/275 |
| 8,276,438 B2 | 10/2012 | Votsmeier et al. | |
| 2011/0258984 A1* | 10/2011 | Santoso | F01N 3/2013 60/274 |
| 2013/0291630 A1* | 11/2013 | Takagi | F01N 9/00 73/114.75 |
| 2014/0283503 A1* | 9/2014 | Roesch | F01N 11/00 60/274 |

* cited by examiner

*Primary Examiner* — Matthew T Largi
(74) *Attorney, Agent, or Firm* — Burris Law, PLLC (57) ABSTRACT

A method includes providing electric power to an electrically heated catalyst of an exhaust aftertreatment system. The method includes obtaining an impedance value of the electrically heated catalyst in response to providing the electric power. The method includes determining an oxygen storage capacity of the electrically heated catalyst based on the impedance value.

18 Claims, 6 Drawing Sheets

METHODS AND SYSTEMS FOR DETECTING AN IMPEDANCE OF A CATALYTIC CONVERTER

FIELD

The present disclosure relates to systems and methods for detecting an impedance of a catalytic converter.

BACKGROUND

The statements in this section merely provide background information related to the present disclosure and may not constitute prior art.

An internal combustion engine (ICE) of a vehicle typically includes an exhaust system to route or handle exhaust gas (i.e., combusted gases) expelled from one or more cylinders of the ICE. Furthermore, an exhaust aftertreatment system in communication with the ICE may be used to treat the exhaust gas before it exits the exhaust system by catalyzing oxidization of carbon monoxide to carbon dioxide, oxidization of hydrocarbons to carbon dioxide and water, and reduction of nitrogen oxides (i.e., NOx) to nitrogen gas.

Such an exhaust aftertreatment system typically includes a catalytic converter that operates at various temperature. Furthermore, a temperature gradient of the catalytic converter may indicate whether catalytic materials of the catalytic converter have degraded and thereby affected the efficiency of the exhaust aftertreatment system. Accordingly, the exhaust aftertreatment system may include one or more temperature sensors configured to obtain temperature data of the catalytic converter.

SUMMARY

This section provides a general summary of the disclosure and is not a comprehensive disclosure of its full scope or all of its features.

The present disclosure provides a method including providing electric power to an electrically heated catalyst of an exhaust aftertreatment system. The method includes obtaining an impedance value of the electrically heated catalyst in response to providing the electric power. The method includes determining an oxygen storage capacity of the electrically heated catalyst based on the impedance value.

The present disclosure provides a system that includes a processor and a nontransitory computer-readable medium including instructions that are executable by the processor. The instructions include providing electric power to an electrically heated catalyst of an exhaust aftertreatment system. The instructions include obtaining an impedance value of the electrically heated catalyst in response to providing the electric power. The instructions include determining an oxygen storage capacity of the electrically heated catalyst based on the impedance value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system for determining structural degradation of a catalytic converter (e.g., an electrically heated catalytic (EHC) converter) in an exhaust aftertreatment system of an internal combustion engine (ICE) includes a power regulator module and an engine controller. The power regulator module includes various modules that provide electric power applied to and obtain an impedance value of the catalytic converter. The engine controller includes various modules that receive an air-to-fuel ratio of exhaust gas flowing through the exhaust aftertreatment system, determine an oxygen storage capacity (OSC) of the exhaust aftertreatment system, and determine an amount of degradation based on the OSC and the impedance value of the catalytic converter. Accordingly, the exhaust aftertreatment system can accurately monitor an impedance gradient (or temperature gradient) of the catalytic converter to determine an integrity of the catalytic converter without the use of or in conjunction with temperature sensors. Furthermore, the exhaust aftertreatment system can verify that one or more temperature sensors thereof are properly functioning and, more specifically, the one or more temperature sensors are obtaining accurate temperature measurements. As used herein, the term "gradient" refers to a change in magnitude of a property as a function of time. As used herein, "integrity" refers to the structural integrity of a component of the exhaust aftertreatment system and/or the operating characteristics of a component of the exhaust aftertreatment system (e.g., sensor functionality, sensor accuracy, catalyst aging, degradation of cerium (Ce) and/or a platinum group metal (PGM) within the catalyst, among others).

Figure 1A:
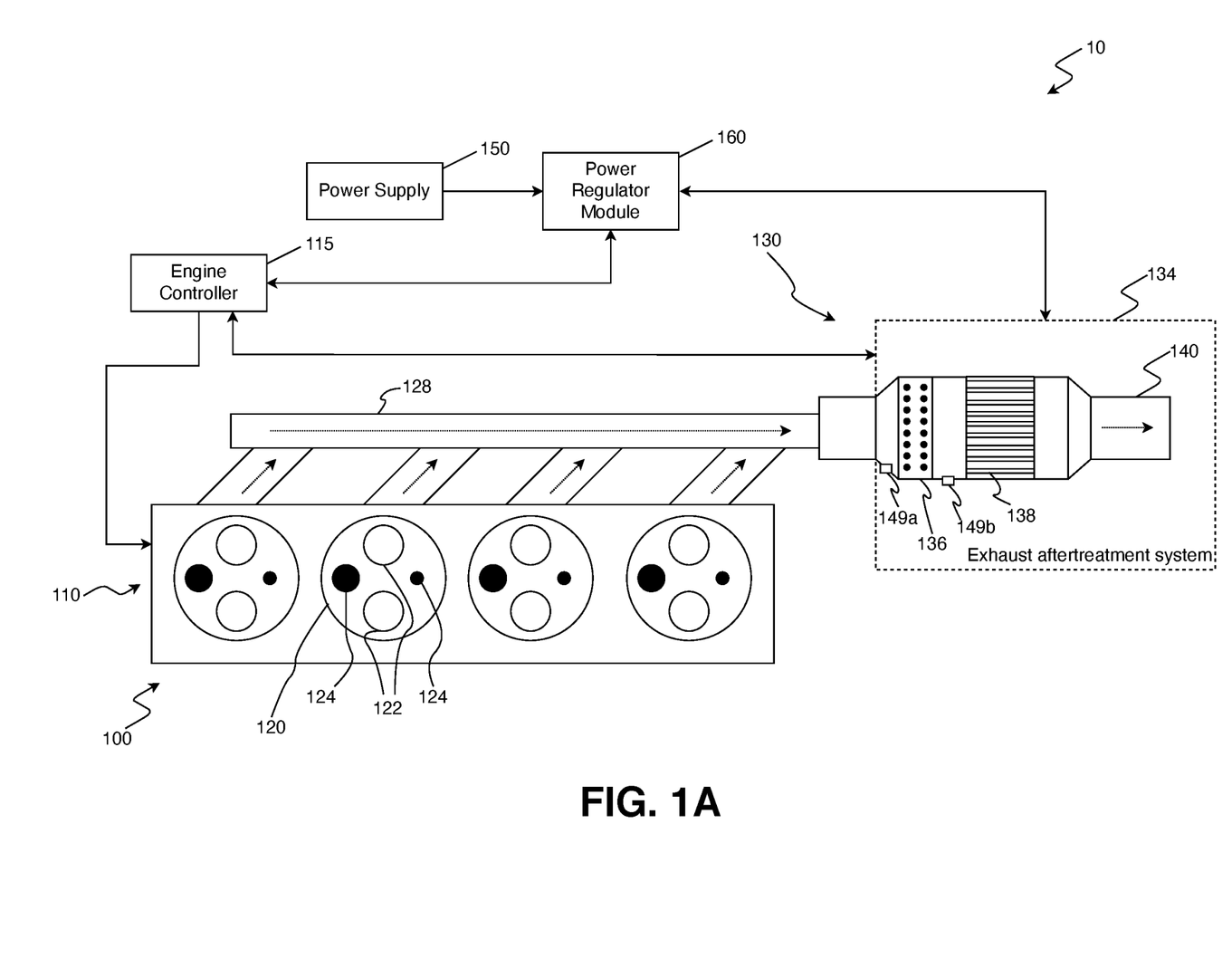
FIG. 1A illustrates a vehicle according to the teachings of the present disclosure.

Referring to FIG. 1A, a vehicle 10 that controls and monitors an impedance and/or temperature of a component (e.g., an EHC converter, a particulate filter, among others) of the vehicle 10 is shown. In some forms, the vehicle 10 includes an ICE 100, an exhaust system 130, a power supply 150, and a power regulator module 160.

The ICE 100 includes an engine controller 115 and a cylinder bank 110 that includes a plurality of cylinders 120. Each cylinder 120 includes at least two valves 122 (e.g., an intake valve and an exhaust valve), a fuel injector 124, and a spark initiator 126 (e.g., a spark plug). A manifold 128 is in fluid communication with the cylinder bank 110.

The exhaust system 130 includes an exhaust pipe 132 and an exhaust aftertreatment system 134 with various components to filter exhaust gas flowing therethrough. As an example, the exhaust aftertreatment system 134 includes a catalytic converter 136 (e.g., a three-way catalytic (TWC) converter, an EHC converter, among others) and a particulate filter 138 disposed downstream from the catalytic converter 136. While the particulate filter 138 and the catalytic converter 136 are shown as individual components, it should be understood that the particulate filter 138 may be integrated within the catalytic converter 136 in some variations.

Figure 1B:
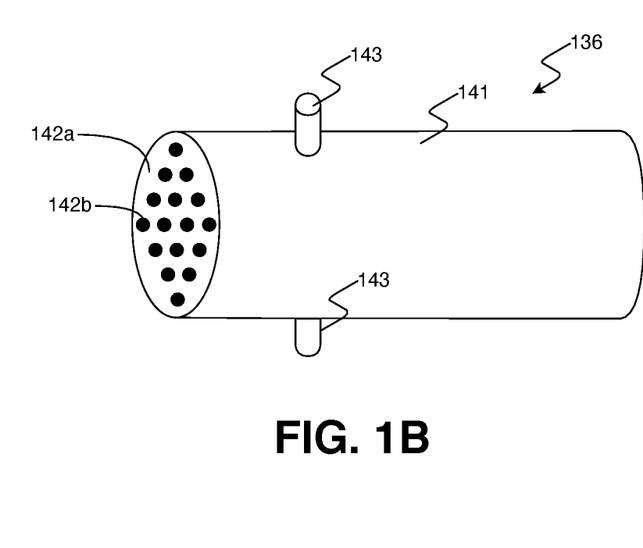
FIG. 1B is a catalytic converter according to the teachings of the present disclosure.

With reference to FIG. 1B, an example illustration of the catalytic converter 136 is shown. In some forms, the catalytic converter 136 is an EHC converter that includes an electrically conductive portion 141, a substrate 142a, a catalyst material 142b disposed on and supported by the substrate 142a, and electrical leads 143. While two electrical leads 143 are shown, it should be understood that the catalytic converter 136 may include any number of electrical leads 143. In some forms, the electrically conductive portion 141 and the electrical leads 143 include an electrically conductive material that is suitable for operating at predefined temperatures, such as up to 650° C. As an example, the electrically conductive portion 141 and the electrical leads 143 include an electrically conductive material such as nickel, copper, chromium, molybdenum, tungsten, iron, aluminum, silicon, boron, an alloy thereof, among others. The electrically conductive portion 141 may surround the substrate 142a and the catalyst material 142b. For example, in some variations, the electrically conductive portion 141 is a metallic sheet surrounding the substrate 142a. In other variations, the electrically conductive portion 141 includes the electrically conductive material disposed on and/or within the substrate 142a such that an electrical current can flow from one portion or region of the catalytic converter 136 to another portion or region of the catalytic converter 136. In still other variations, the electrically conductive portion 141 can be one or more resistive heating elements disposed on and/or within the substrate 142a.

In at least one variation, the substrate 142a is ceramic material with a honeycomb structure (e.g., a "brick"), and the catalyst material 142b can include platinum group metals (PGMs) (e.g., palladium, platinum, rhodium, among others), disposed on the catalyst material 142b. For example, a washcoat containing PGMs can be applied to the substrate 142a. Accordingly, when the electrically conductive portion 141 receives electrical power from the power supply 150 via the power regulator module 160 and the electrical leads 143, the substrate 142a and/or the catalyst material 142b is heated, thereby enhancing the reduction of the nitrogen oxides (NOx) to nitrogen (N2), the oxidation of carbon monoxide (CO) to carbon dioxide ($CO_2$), and the oxidation of unburnt hydrocarbons (HCs) into $CO_2$ and water ($H_2O$) from exhaust gas flowing through the catalytic converter 136, as described below in further detail.

With reference to FIG. 1A, the exhaust system 130 includes a pre-converter universal heated exhaust gas oxygen (UHEGO) sensor 149a upstream from the catalytic converter 136 and a post-converter UHEGO sensor 149b disposed downstream from the catalytic converter 136. In some variations of the present disclosure, the pre-converter UHEGO sensor 149a and the post-converter UHEGO sensor 149b are disposed in the exhaust pipe 132. The pre-converter UHEGO sensor 149a and the post-converter UHEGO sensor 149b are in communication with the engine controller 115 by way of, for example, a vehicle communication network, such as a controller area network (CAN), a local interconnect network (LIN), among others. It should be understood that a UHEGO sensor provides real time lambda (λ) values in contrast to simple "rich" and "lean" indicators as with heat exhaust gas oxygen (HEGO) sensors. That is, a UHEGO sensor provides an actual λ value for an exhaust gas flowing past the UHEGO sensor. It should also be understood that as used herein the term "lambda" and the symbol "λ" refer to the air-fuel ratio in an exhaust gas where λ equal to 1.0 (λ=1.0) refers to the stoichiometric air-fuel ratio, (i.e., the exhaust gas contains the exact amount of fuel and air needed for stoichiometric combustion, which is 14.7 kg of air per 1 kg of fuel). Also, λ<1.0 refers to an air-fuel ratio for exhaust gas with more fuel than air needed for stoichiometric combustion (also referred to herein as "rich" or "rich mixture"), and λ>1.0 refers to an air-fuel ratio for exhaust gas with less fuel than air needed for stoichiometric combustion (also referred to herein as "lean" or "lean mixture").

With continued reference to FIG. 1A, the power supply 150 is configured to provide electrical power to various components of the vehicle 10. As an example, the power supply 150 includes a direct current (DC) power source (e.g., a battery) configured to provide DC electrical power. As another example, the power supply 150 includes an alternating current (AC) power source and a rectifier circuit configured to provide the DC electrical power.

The power regulator module 160 includes one or more modules for monitoring an impedance of the particulate filter 138. Additionally, the power regulator module 160 includes one or more modules for controlling a magnitude of the electrical power supplied to the particulate filter 138. The functionality of the power regulator module 160 is described below in further detail with reference to FIG. 2.

With reference to FIGS. 1A-1B, the operation of the vehicle 10 is now provided. The vehicle 10 is operable in various propulsion modes. As an example, the vehicle 10 is operable in one of an electric propulsion mode, an ICE propulsion mode, or a hybrid propulsion mode (i.e., a combination of the electric propulsion mode and the ICE propulsion mode)).

During the electric propulsion mode, the power supply 150 (and other power electronics systems not shown) generate the propulsion forces to drive (i.e., power or move) the vehicle 10. Furthermore, during the operation of the vehicle 10 in the electric propulsion mode, the ICE 100 is deactivated, as the vehicle 10 is propelled by electrical power from the power supply 150. Accordingly, no exhaust gas flow is directed through the exhaust aftertreatment system 134.

During the ICE propulsion mode, the ICE 100 generates the propulsion forces to drive the vehicle 10. During the hybrid propulsion mode, the power supply 150 (and other power electronics systems not shown) and the ICE 100 generate the propulsion forces to drive the vehicle. Furthermore, during the operation of the vehicle 10 in the ICE propulsion mode or the hybrid propulsion mode, the engine controller 115 directs fuel via the fuel injectors 124 and air via the valves 122 (i.e., intake valves) into each of the cylinders 120. The engine controller 115 also directs firing of each of the spark initiators 126 such that the fuel plus air mixture in each cylinder 120 is combusted and expelled from the cylinders 120 via the valves 122 (i.e., exhaust valves) as exhaust gas (not labeled).

The exhaust gas expelled from the cylinders 120 flows through the manifold 128, the exhaust pipe 132, the catalytic converter 136, and the particulate filter 138, and the exhaust gas exits the exhaust system 130 at outlet 140. As the exhaust gas flows through the exhaust system 130, the catalytic converter 136 provides reduction of NOx to N2, oxidation of CO to $CO_2$, and oxidation of unburnt HCs into $CO_2$ and $H_2O$ (collectively referred to as the treatment of exhaust gas flow).

Figure 2:
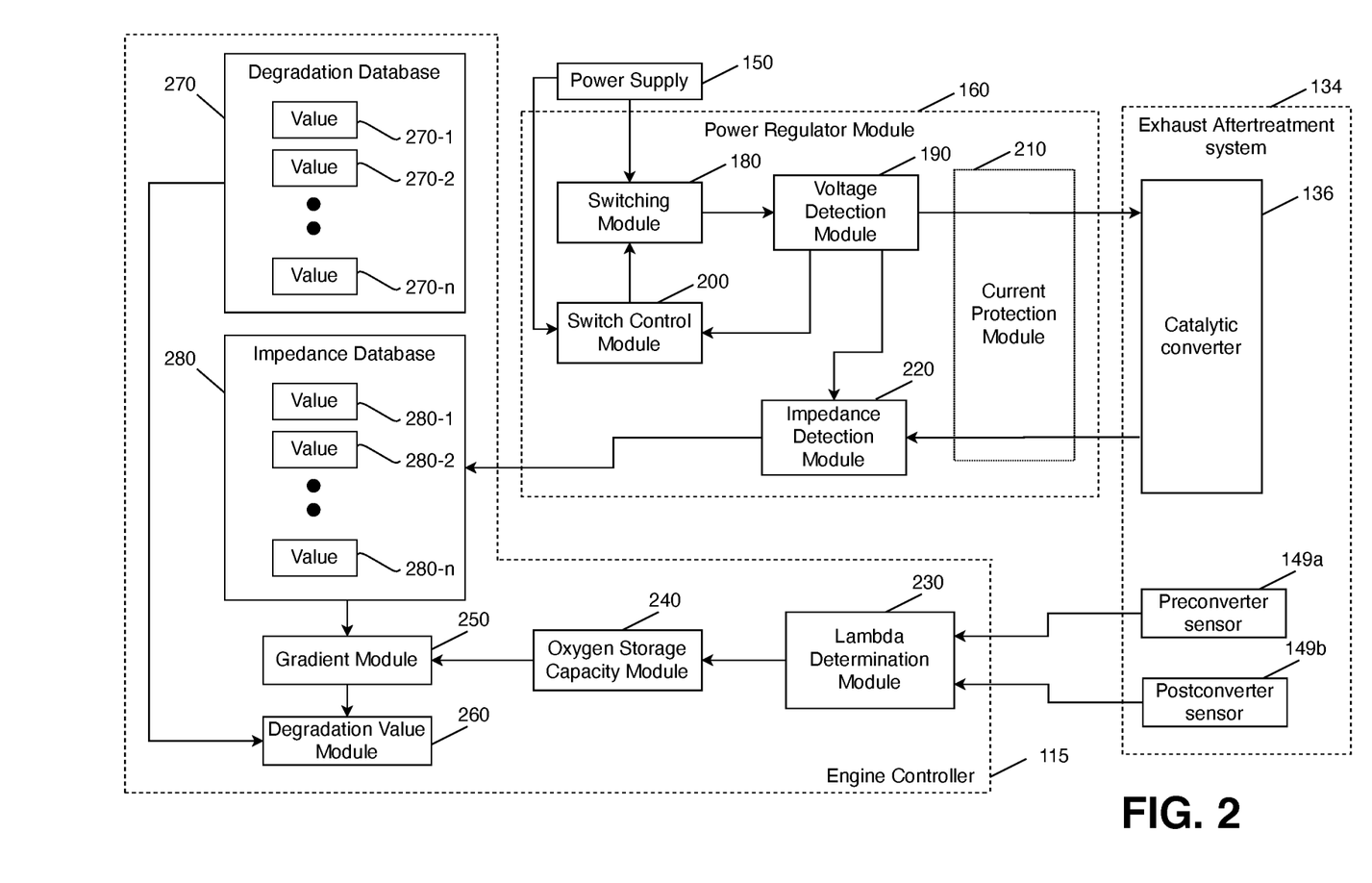
FIG. 2 is a block diagram of a system for monitoring a temperature of an exhaust aftertreatment system according to the teachings of the present disclosure.

Referring to FIG. 2, an example functional block diagram of the engine controller 115, the exhaust aftertreatment system 134, and the power regulator module 160 is shown. The power regulator module 160 may include a switching module 180, a voltage detection module 190, a switch control module 200, a current protection module 210, and an impedance detection module 220. In some forms, at least a portion of the power regulator module 160 is located on a microcontroller that includes a processor configured to execute instructions stored in a nontransitory computer-readable medium, such as a random-access memory (RAM) and/or a read-only memory (ROM). In other forms, at least a portion of the power regulator module 160 is communicatively coupled to an external microcontroller that includes a processor configured to execute instructions stored in a nontransitory computer-readable medium, such as a RAM and/or ROM.

The engine controller 115 may include a lambda determination module 230, an oxygen storage capacity (OSC) module 240, a gradient module 250, a degradation value module 260, a degradation database 270, and an impedance database 280. In some forms, at least a portion of the engine controller 115 is located on or communicatively coupled with a microcontroller that includes a processor configured to execute instructions stored in a nontransitory computer-readable medium, such as a RAM and/or ROM.

The switching module 180 is configured to receive the electrical power from the power supply 150 and output a pulse width modulated (PWM) signal. In some forms, the switching module 180 may include one or more switching devices, such as a bipolar junction transistor (BJT), an insulated gate bipolar transistor (IGBT), a metal-oxide semiconductor field-effect transistor (MOSFET), and/or the like. The operation of the switching module 180 may be controlled by the switch control module 200, as described below in further detail.

The voltage detection module 190 is configured to detect a voltage magnitude of the PWM signal output by the switching module 180. As an example, the voltage detection module 190 may include one or more resistors that form a voltage divider with the switching module 180 and/or the switch control module 200, an operational amplifier configured to detect the voltage magnitude, an integrated circuit configured to detect the voltage magnitude, an analog-to-digital converter (ADC) configured to output a digital signal representing the voltage magnitude, among others. The voltage magnitude may be provided to the switch control module 200, which subsequently controls the operation of the switching module 180 based on the voltage magnitude, as described below in further detail.

The switch control module 200 is configured to control the operation of the switching module 180 based on the voltage magnitude as determined by the voltage detection module 190. To control the operation of the switching module 180, the switch control module 200 is configured to selectively provide a biasing voltage to the switching devices of the switching module 180, thereby activating or deactivating the switching devices. Furthermore, the switch control module 200 may include an additional step-down voltage converter to convert the voltage magnitude of the electrical signal received from the power supply 150 to the biasing voltage magnitude.

The current protection module 210 is configured to limit the amount of current provided to the component of the exhaust aftertreatment system 134 when the power regulator module 160 is activated (e.g., turned on) and during steady-state operation of the power regulator module 160. Likewise, the current protection module 210 is configured to limit the amount of reverse current provided to the power regulator module 160 when the power regulator module 160 is deactivated (e.g., turned off). In some forms, the current protection module 210 may include a fuse, a thermistor, a network of transistors and/or diodes, an integrated circuit that provides active and resettable overcurrent protection, among others.

The impedance detection module 220 is configured to generate a signal indicating the impedance value of the catalytic converter 136 when the catalytic converter 136 receives electrical power from the power regulator module 160. The impedance detection module 220 may include various combinations of passive or active electronic components used to indicate the impedance value of the particulate filter 138. As an example, the impedance detection module 220 may include one or more resistors electrically coupled to the catalytic converter 136 such that a voltage divider circuit is formed. Based on the known resistance of the one or more resistors, the voltage magnitude of the PWM signal as determined by the voltage detection module 190, and a voltage magnitude of a common node of the one or more resistors and the catalytic converter 136, the impedance detection module 220 is configured to generate the signal indicating the resistance of the catalytic converter 136. As another example, the impedance detection module 220 may include a resistor-capacitor (RC) network, a resistor-inductor (RL) network, or a resistor-capacitor-inductor (RLC) network electrically coupled to the catalytic converter 136 such that a voltage divider circuit is formed. Based on the known reactance of the RC network, RL network, or RLC network, the voltage magnitude of the PWM signal as determined by the voltage detection module 190, and a voltage magnitude of a common node of one of the RC network, RL network, or RLC network and the catalytic converter 136, the impedance detection module 220 is configured to generate the signal indicating the reactance of the catalytic converter 136.

While the power regulator module 160 provides power to the catalytic converter 136, the impedance detection module 220 is configured to determine a plurality of impedance values of the catalytic converter 136. In some forms, the number of impedance values obtained by the impedance detection module 220 may be based on the pulse width of the signal provided to the catalytic converter 136. In response to determining the plurality of impedance values, the impedance detection module 220 is configured to store the measured impedance values as the impedance values 282-1, 282-2, . . . 282-$n$ (collectively referred to as impedance values 282) in the impedance database 280. As described below in further detail, the gradient module 250 is configured to generate an impedance gradient based on the impedance values 282.

In some forms, the power regulator module 160 may include a temperature determination module (not shown) that is configured to determine the temperature of the catalytic converter 136 based on the impedance value as determined by the impedance detection module 220. In some forms, the temperature determination module determines the temperature by referencing a lookup table that correlates various impedance values with corresponding temperatures.

The lambda determination module 230 is configured to receive the λ values from the pre-converter UHEGO sensor 149a and the post-converter UHEGO sensor 149b and determine whether the exhaust gas flowing through the exhaust aftertreatment system 134 satisfies a lambda condition. As an example, the lambda condition is satisfied when the sensor data from one of the pre-converter UHEGO sensor 149a and the post-converter UHEGO sensor 149b indicates that the λ value of the exhaust gas is equal to a predefined λ value, such as the stoichiometric air-fuel ratio (λ=1.0). As another example, the lambda condition is satisfied when the sensor data from the pre-converter UHEGO sensor 149a indicates that the λ value of the exhaust gas is equal to a predefined λ value at a first time, and when the sensor data from the post-converter UHEGO sensor 149b indicates that the λ value of the exhaust gas is equal to the predefined λ value at a second, subsequent time.

The OSC module 240 is configured to determine an OSC value when the lambda condition is satisfied. The OSC value may be time difference between the post-converter UHEGO sensor 149b indicating that the exhaust gas satisfies the lambda condition and the pre-converter UHEGO sensor 149a indicating that the exhaust gas satisfies the lambda condition. As an example, if the pre-converter UHEGO sensor 149a indicates that the lambda condition is satisfied at $T_1$, and the post-converter UHEGO sensor 149b indicates that the exhaust gas satisfies the lambda condition at $T_2$, the OSC module 240 may determine the OSC value to be $T_2-T_1$. Accordingly, the OSC value may represent the time required for depletion of oxygen of the catalytic converter 136 while it is subjected to a rich mixture of exhaust gas. The OSC value may also provide a measure of the OSC capability of the catalytic converter 136, e.g., the efficiency or rate of oxygen release from the catalytic converter 136. In the alternative, the OSC value may represent the time required for complete storage of oxygen in the catalytic converter 136 while it is subjected to a lean mixture of exhaust gas and/or the efficiency or rate of oxygen storage by the catalytic converter 136.

The gradient module 250 is configured to generate at least one of an impedance gradient and a temperature gradient of the catalytic converter 136 based on the plurality of impedance values 282 and the OSC value. The impedance gradient may represent an impedance change of the catalytic converter 136 as a function of OSC value. As an example, if the OSC value is equal to $T_2-T_1$, the impedance value 282-1 at time $T_1$ is $R_1$, and the impedance value 282-2 at time $T_2$ is $R_2$, the impedance gradient (ΔR) may be represented using the following relation:

$$\Delta R = \frac{R_2 - R_1}{T_2 - T_1} \quad (1)$$

Likewise, the temperature gradient may represent a temperature (Tx) change (as indicated by the impedance values 282) of the catalytic converter 136 as a function of OSC value. As an example, if the OSC value is equal to $T_2-T_1$, the temperature at time $T_1$ is $Tx_1$, and the temperature at time $T_2$ is $Tx_2$, the impedance gradient (ΔTx) may be represented using the following relation:

$$\Delta Tx = \frac{Tx_2 - Tx_1}{T_2 - T_1} \quad (2)$$

The degradation value module 260 is configured to determine an amount of degradation of the catalytic converter 136 by correlating at least one of the impedance gradient and the temperature gradient to a plurality of degradation values 272-1, 272-2, . . . 272-n (collectively referred to as degradation values 272) in the degradation database 270. Each of the degradation values 272 may correlate a unique impedance gradient and/or the temperature gradient to an integrity of the catalytic converter 136, such as an amount of degradation, deterioration, efficiency decrease, and/or other similar metric of a particular component of the catalytic converter 136 (e.g., the conductive portion 141, the substrate 142a, the catalyst material 142b, among others). As an example, degradation value 272-1 may correlate a first impedance gradient to a 20% degradation and/or efficiency decrease of the catalyst material 142b. Furthermore, the degradation value module 260 may selectively generate an alert based on the degradation value, as described below in further detail with reference to FIG. 4.

With reference to FIGS. 1A-1B, 2, and 3, an example routine 300 is shown. At 304, the engine controller 115 determines an exhaust state of the exhaust aftertreatment system 134 based on the sensor data received from the pre-converter UHEGO sensor 149a and the post-converter UHEGO sensor 149b. At 308, the engine controller 115 determines, based on the sensor data received from the pre-converter UHEGO sensor 149a and the post-converter UHEGO sensor 149b, whether the exhaust state of the exhaust aftertreatment system 134 changes (e.g., the engine controller 115 determines whether the exhaust state changes from a "lean mixture" state to a "rich mixture" state). If the exhaust state of the exhaust aftertreatment system 134 changes, the routine 300 proceeds to 312, where the engine controller 115 determines the degradation value and/or corresponding integrity of the catalytic converter 136. If the exhaust state of the exhaust aftertreatment system 134 does not change, the routine 300 proceeds to 304. At 316, the engine controller 115 determines whether the degradation value and/or corresponding integrity indicates service of the catalytic converter 136 is required. If so, the routine 300 proceeds to 320, where the engine controller 115 generates an alert (e.g., the engine controller 115 generates a signal that causes a dashboard, display, auditory alert system, haptic alert system, among others, to alert an occupant of the vehicle 10 of the integrity of the catalytic converter 136). In some forms, at 320, the engine controller 115 may also perform a corrective action routine based on the determined integrity of the catalytic converter 136 to mitigate further integrity losses to the catalytic converter 136. Otherwise, the routine 300 proceeds to 308.

Referring to FIGS. 1, 2A-2B, 3, and 4-5, an example routine 400 is shown. The routine 400 represents an example routine for determining the degradation value and/or integrity of the catalytic converter 136 described at step 312 of FIG. 3.

Figure 4:
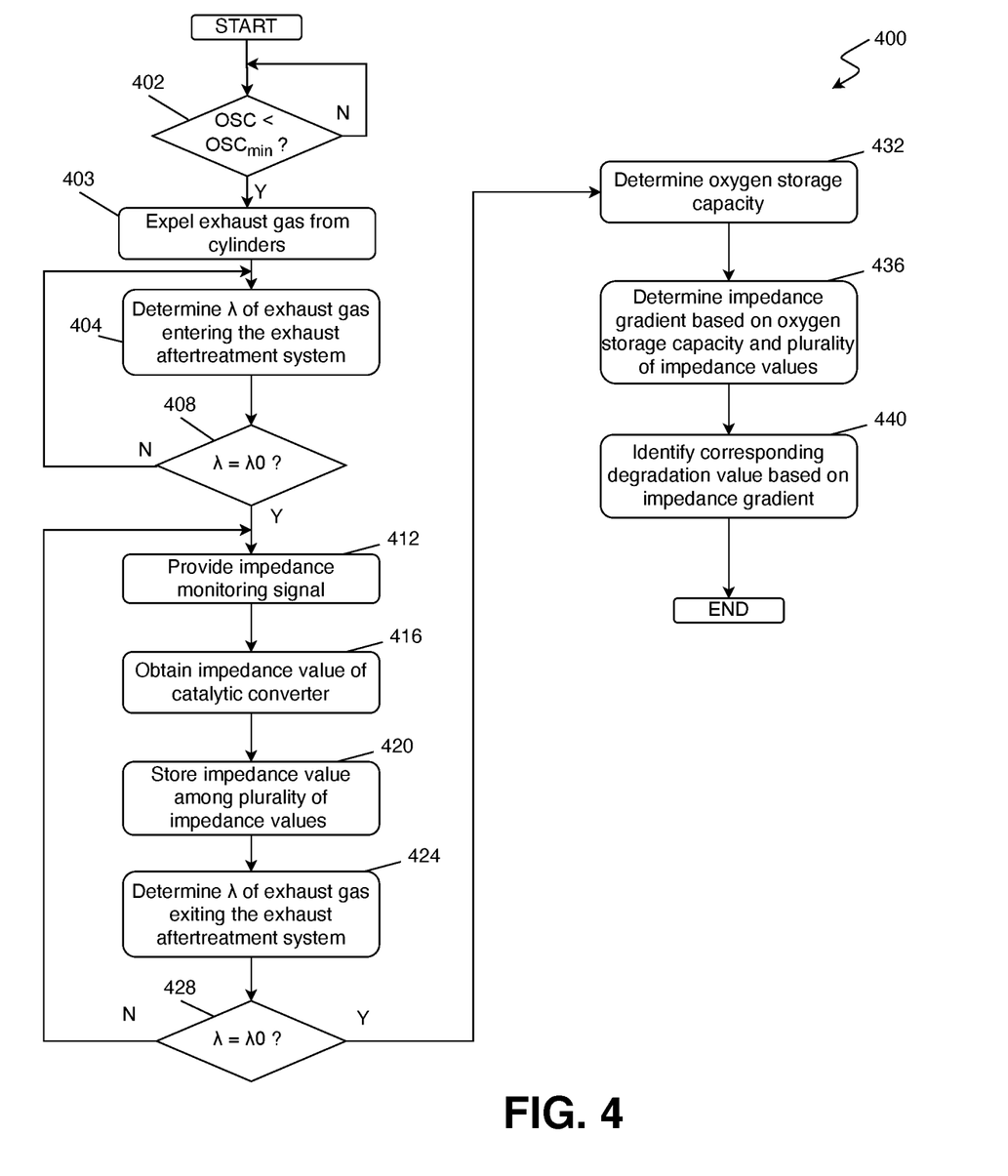
FIG. 4 is a flow chart for determining a degradation value of a catalytic converter according to the teachings of the present disclosure.

At 402, the engine controller 115 determines if the OSC of the catalytic converter 136 is less than a minimum OSC threshold ($OSC_{min}$). In some variations of the present disclosure the $OSC_{min}$ corresponds to the catalytic converter 136 being depleted of $O_2$ due to rich exhaust gas flowing though the exhaust aftertreatment system 134 as indicated by λR on λ graph 510 of FIG. 5. If the engine controller 115 determines the OSC is less than the $OSC_{min}$, the routine 400 proceeds to 403 where the engine controller 115 commands a lean exhaust gas protocol. Otherwise, the routine 400 proceeds to 402.

At 403, the engine controller 115 commands the fuel injectors 124, valves 122, and spark initiators 126 of each cylinder 120 such that an exhaust gas with a desired lean λ value (λL) is expelled from the cylinders 120 and enters the exhaust aftertreatment system 134.

Figure 5:
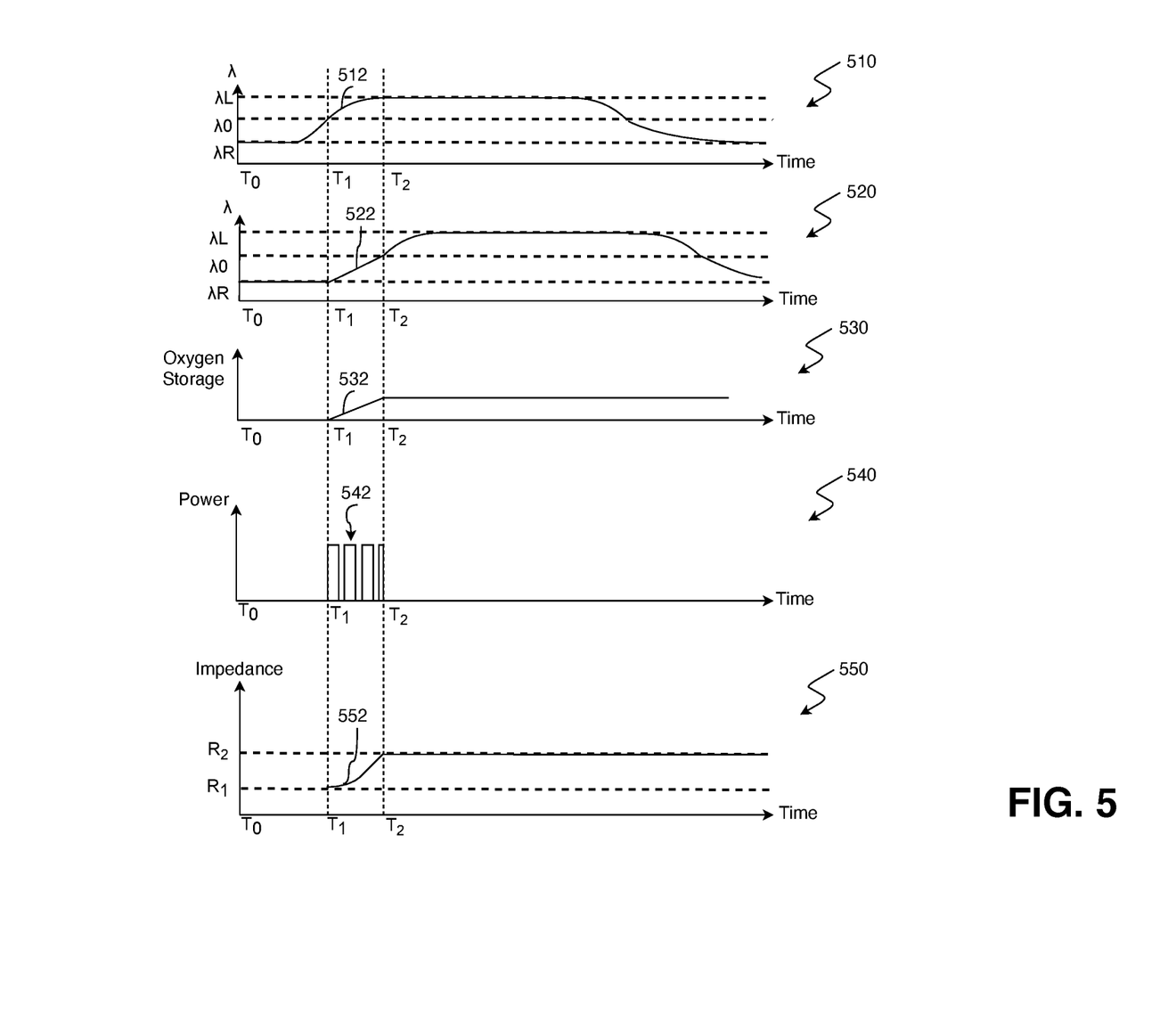
FIG. 5 illustrates graphs of a lambda value obtained by a plurality of sensors as a function of time, an oxygen storage capacity (OSC) as a function of time, electrical power supplied to catalytic converter as a function of time, and an impedance of a catalytic converter as a function of time according to the teachings of the present disclosure.

At 404, the engine controller 115 determines the λ value of the exhaust gas entering the exhaust aftertreatment system 134 (i.e., entering the catalytic converter 136) based on the sensor data obtained by the pre-converter UHEGO sensor 149a (illustrated by λ curve 512 of λ graph 510 of FIG. 5). At 408, the engine controller determines whether the λ value of the exhaust gas entering the exhaust aftertreatment system 134 satisfies a lambda condition (λ0) (e.g., the engine controller 115 determines whether λ=λ0=1.0). If the engine controller 115 determines the lambda condition is satisfied (e.g., the engine controller 115 determines Δ=λ0=1.0 at the pre-converter UHEGO sensor 149a at time $T_1$), the routine 400 proceeds to 412, otherwise, the routine 400 proceeds to 404. It should be understood that under the lean exhaust gas protocol where the λ of the exhaust gas is changing from λR to λL, time T1 is the time at which lean exhaust gas (i.e., λ>1.0) starts flowing into the catalytic converter 136 and $O_2$ storage in the catalytic converter 136 begins. It should also be understood that during $O_2$ storage in the catalytic converter 136, the temperature and the impedance of the catalytic converter 136 changes (e.g., increases).

At 412, the power regulator module 160 provides impedance monitoring signal 542 (shown in electric power graph 540 of FIG. 5). In some variations of the present disclosure, the power regulator module 160 provides impedance monitoring signal 542 at time $T_1$. At 416, the power regulator module 160 obtains the impedance value of the catalytic converter 136 and stores the impedance value among the impedance values 282 of the impedance database 280 at 420.

At 424, the engine controller 115 determines the λ value of the exhaust gas exiting the catalytic converter 136 based on the sensor data obtained by the post-converter UHEGO sensor 149b (illustrated by λ curve 522 of λ graph 520 of FIG. 5). At 428, the engine controller determines whether the λ value of the exhaust gas exiting the catalytic converter 136 satisfies the lambda condition (e.g., the engine controller 115 determines whether Δ=λ0=1.0). If the engine controller 115 determines the lambda condition is satisfied (e.g., the engine controller 115 determines Δ=λ0=1.0 at the post-converter UHEGO sensor 149b at time at $T_2$), the routine 400 proceeds to 432; otherwise, the routine 400 proceeds to 412. It should be understood that meeting the lambda condition at time $T_2$, i.e., when the engine controller 115 determines the post-converter UHEGO sensor 149b is sensing a exhaust gas with Δ=λ0, the time required for the post-converter UHEGO sensor 149b to read and provide Δ=λ0 to the engine controller 115 (i.e., $T_2-T_1$) is a measure of the OSC of the catalytic converter 136. It should also be understood that at 428, the engine controller 115 may determine whether the impedance and corresponding temperature satisfies a predetermined condition (e.g., the impedance and/or temperature returns to a nominal value) in conjunction with or in place of utilizing the post-converter UHEGO sensor 149b to determine whether the lambda condition is satisfied at time $T_2$).

For example, at 432, the engine controller 115 determines the OSC as a function of time as indicated by oxygen curve 532 of oxygen graph 530 in FIG. 5. At 436, the engine controller 115 determines the impedance gradient based on the OSC and the impedance values 282. As an example, the engine controller 115 determines the impedance gradient (λR) based on impedance curve 552 of impedance graph 550 in FIG. 5, which illustrates the impedance value 282-1 at time $T_1$ as $R_1$ and the impedance value 282-2 at time $T_2$ as $R_2$. At 440, the engine controller 115 identifies, based on the impedance gradient, the corresponding degradation value 272 from the degradation database 270 and then ends. It should be understood that the impedance gradient is also a measure of the OSC of the catalytic converter 136. Accordingly, the impedance gradient can be used as a back-up measure of the OSC of the catalytic converter 136 obtained from the pre-converter UHEGO sensor 149a and the post-converter UHEGO sensor 149b, or in the alternative, as a primary measure of the OSC of the catalytic converter 136.

Figure 3:
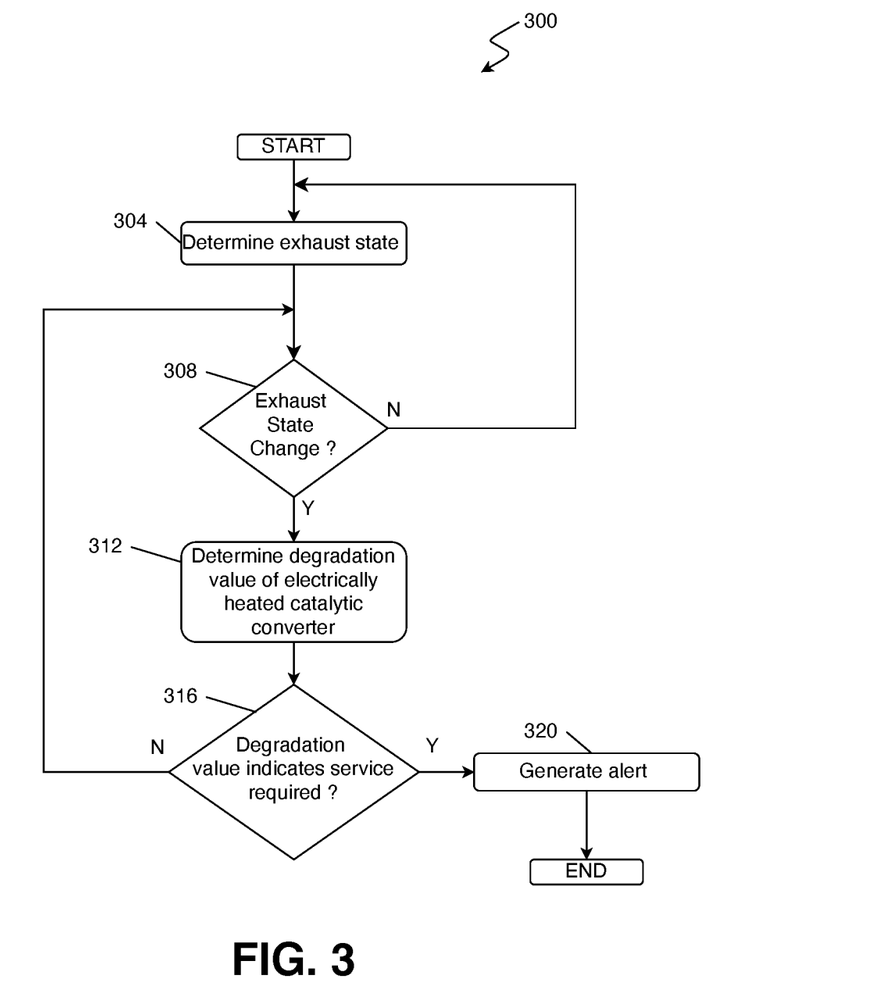
FIG. 3 is a flow chart for operating a power regulator module and an engine controller according to the teachings of the present disclosure.

It should be understood that routines 300, 400 are merely example control routines and other control routines may be implemented.

By using the engine controller 115 and the power regulator module 160 to determine an impedance value and an amount of degradation of the catalytic converter 136, the exhaust aftertreatment system 134 can accurately monitor the integrity of the catalytic converter 136 without the use of temperature sensors.

Based on the foregoing, the following provides a general overview of the present disclosure and is not a comprehensive summary.

In some forms of the present disclosure, the method further includes determining, based on sensor data received from one or more sensors, when a lambda value of an exhaust gas flowing through the exhaust aftertreatment system satisfies a lambda condition, where the lambda value represents an air-to-fuel ratio of the exhaust gas. In some forms of the present disclosure, the method further includes determining a degradation value of the electrically heated catalyst based on the impedance value and the oxygen storage capacity when the lambda condition is satisfied.

In some forms of the present disclosure, determining, based on the sensor data received from the one or more sensors, the lambda value of the exhaust gas flowing through the exhaust aftertreatment system satisfies the lambda condition further includes obtaining pre-converter sensor data from a first universal heated exhaust gas oxygen (UHEGO) sensor, where the pre-converter sensor data indicates a first lambda value of the exhaust gas entering the exhaust aftertreatment system. In some forms of the present disclosure, determining, based on the sensor data received from the one or more sensors, the lambda value of the exhaust gas flowing through the exhaust aftertreatment system satisfies the lambda condition further includes obtaining post-converter sensor data from a second UHEGO sensor, wherein the post-converter sensor data indicates a second lambda value of the exhaust gas exiting the exhaust aftertreatment system.

In some forms of the present disclosure, the lambda condition is satisfied when one of the first lambda value and the second lambda value indicates that an air-fuel ratio of the exhaust gas is equal a stoichiometric air-fuel ratio.

In some forms of the present disclosure, the lambda condition is satisfied between a first time and a second time, and the second time is subsequent to the first time. In some forms of the present disclosure, the first lambda value is equal to a predefined lambda value at the first time, and the second lambda value is equal to the predefined lambda value at the second time.

In some forms of the present disclosure, the method further includes setting the exhaust gas to one of a rich state and a lean state. In some forms of the present disclosure, the method further includes determining, based on the sensor data received from the one or more sensors, the lambda value of the exhaust gas flowing through the exhaust aftertreatment system satisfies the lambda condition in response to setting the exhaust gas to one of the rich state and the lean state.

In some forms of the present disclosure, the method further includes obtaining a plurality of impedance values of the electrically heated catalyst and determining an impedance gradient of the electrically heated catalyst based on the plurality of impedance values and the oxygen storage capacity.

In some forms of the present disclosure, the method further includes determining a temperature gradient of the electrically heated catalyst based on the impedance gradient and correlating the temperature gradient to a degradation value from a plurality of degradation values.

In some forms of the present disclosure, obtaining the impedance value of the electrically heated catalyst in response to providing the electric power further includes obtaining an impedance value from an impedance detection circuit in response to providing the electric power, where the impedance detection circuit is electrically coupled to the electrically heated catalyst. In some forms of the present disclosure, obtaining the impedance value of the electrically heated catalyst in response to providing the electric power further includes determining the impedance value of the electrically heated catalyst based on the impedance value of the impedance detection circuit.

In some forms of the present disclosure, providing the electric power to the electrically heated catalyst further includes selectively activating one or more switches of a switching circuit, where the switching circuit electrically couples the electrically heated catalyst and a power supply.

In some forms of the present disclosure, the instructions further include determining, based on sensor data received from one or more sensors, when a lambda value of an exhaust gas flowing through the exhaust aftertreatment system satisfies a lambda condition, where the lambda value represents an air-to-fuel ratio of the exhaust gas. In some forms of the present disclosure, the instructions further include determining a degradation value of the electrically heated catalyst based on the impedance value and the oxygen storage capacity when the lambda condition is satisfied.

In some forms of the present disclosure, the instructions for determining, based on the sensor data received from the one or more sensors, the lambda value of the exhaust gas flowing through the exhaust aftertreatment system satisfies the lambda condition further include obtaining pre-converter sensor data from a first universal heated exhaust gas oxygen (UHEGO) sensor, where the pre-converter sensor data indicates a first lambda value of the exhaust gas entering the exhaust aftertreatment system. In some forms of the present disclosure, the instructions for determining, based on the sensor data received from the one or more sensors, the lambda value of the exhaust gas flowing through the exhaust aftertreatment system satisfies the lambda condition further include obtaining post-converter sensor data from a second UHEGO sensor, wherein the post-converter sensor data indicates a second lambda value of the exhaust gas exiting the exhaust aftertreatment system.

In some forms of the present disclosure, the instructions further include setting the exhaust gas to one of a rich state and a lean state. In some forms of the present disclosure, the instructions further include determining, based on the sensor data received from the one or more sensors, the lambda value of the exhaust gas flowing through the exhaust aftertreatment system satisfies the lambda condition in response to setting the exhaust gas to one of the rich state and the lean state.

In some forms of the present disclosure, the instructions further include obtaining a plurality of impedance values of the electrically heated catalyst and determining an impedance gradient of the electrically heated catalyst based on the plurality of impedance values and the oxygen storage capacity.

In some forms of the present disclosure, the instructions further include determining a temperature gradient of the electrically heated catalyst based on the impedance gradient and correlating the temperature gradient to a degradation value from a plurality of degradation values.

In some forms of the present disclosure, the instructions for obtaining the impedance value of the electrically heated catalyst in response to providing the electric power further include obtaining an impedance value from an impedance detection circuit in response to providing the electric power, where the impedance detection circuit is electrically coupled to the electrically heated catalyst. In some forms of the present disclosure, the instructions for obtaining the impedance value of the electrically heated catalyst in response to providing the electric power further include determining the impedance value of the electrically heated catalyst based on the impedance value of the impedance detection circuit.

In some forms of the present disclosure, the instructions for providing the electric power to the electrically heated catalyst further include selectively activating one or more switches of a switching circuit, where the switching circuit electrically couples the electrically heated catalyst and a power supply.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
   determining whether pre-converter sensor data from a first sensor indicating a first lambda value of an exhaust gas entering an exhaust aftertreatment system satisfies a lambda condition, wherein the first lambda value represents an air-to-fuel ratio of the exhaust gas entering the exhaust aftertreatment system;
   determining whether post-converter sensor data from a second sensor indicating a second lambda value of the exhaust gas satisfies the lambda condition, wherein the second lambda value represents an air-to-fuel ratio of the exhaust gas exiting the exhaust aftertreatment system;
   when the first lambda value satisfies the lambda condition and the second lambda value does not satisfy the lambda condition:
      providing electric power to an electrically heated catalyst of the exhaust aftertreatment system; and
      obtaining an impedance value of the electrically heated catalyst in response to providing the electric power; and
   when the second lambda value satisfies the lambda condition:
      determining an oxygen storage capacity of the electrically heated catalyst based on the impedance value; and
      determining a degradation value of the electrically heated catalyst based on the impedance value and the oxygen storage capacity.

2. The method of claim 1, wherein the first sensor and the second sensor are universal heated exhaust gas oxygen (UHEGO) sensors.

3. The method of claim 1, wherein the lambda condition is satisfied when one of the first lambda value and the second lambda value indicates that an air-fuel ratio of the exhaust gas is equal a stoichiometric air-fuel ratio.

4. The method of claim 1, wherein:
   the lambda condition is satisfied between a first time and a second time;
   the second time is subsequent to the first time;
   the first lambda value is equal to a predefined lambda value at the first time; and
   the second lambda value is equal to the predefined lambda value at the second time.

5. The method of claim 1 further comprising:
   setting the exhaust gas to one of a rich state and a lean state; and
   determining, based on the sensor data received from at least one of the first sensor and the second sensor, whether the lambda value of the exhaust gas flowing through the exhaust aftertreatment system satisfies the lambda condition in response to setting the exhaust gas to one of the rich state and the lean state.

6. The method of claim 1 further comprising:
   obtaining a plurality of impedance values of the electrically heated catalyst; and
   determining an impedance gradient of the electrically heated catalyst based on the plurality of impedance values and the oxygen storage capacity.

7. The method of claim 6 further comprising:
   determining a temperature gradient of the electrically heated catalyst based on the impedance gradient; and
   correlating the temperature gradient to a degradation value from a plurality of degradation values.

8. The method of claim 1, wherein obtaining the impedance value of the electrically heated catalyst in response to providing the electric power further comprises:
   obtaining an impedance value from an impedance detection circuit in response to providing the electric power, wherein the impedance detection circuit is electrically coupled to the electrically heated catalyst; and
   determining the impedance value of the electrically heated catalyst based on the impedance value of the impedance detection circuit.

9. The method of claim 1, wherein providing the electric power to the electrically heated catalyst further comprises selectively activating one or more switches of a switching circuit, wherein the switching circuit electrically couples the electrically heated catalyst and a power supply.

10. A system comprising:
   a processor; and
   a nontransitory computer-readable medium comprising instructions that are executable by the processor, wherein the instructions comprise:
      determining whether pre-converter sensor data from a first sensor indicating a first lambda value of an exhaust gas entering an exhaust aftertreatment system satisfies a lambda condition, wherein the first lambda value represents an air-to-fuel ratio of the exhaust gas entering the exhaust aftertreatment system;
      determining whether post-converter sensor data from a second sensor indicating a second lambda value of the exhaust gas satisfies the lambda condition, wherein the second lambda value represents an air-to-fuel ratio of the exhaust gas exiting the exhaust aftertreatment system;

when the first lambda value satisfies the lambda condition and the second lambda value does not satisfy the lambda condition:
  providing electric power to an electrically heated catalyst of the exhaust aftertreatment system; and
  obtaining an impedance value of the electrically heated catalyst in response to providing the electric power; and when the second lambda value satisfies the lambda condition:
  determining an oxygen storage capacity of the electrically heated catalyst based on the impedance value; and
  determining a degradation value of the electrically heated catalyst based on the impedance value and the oxygen storage capacity.

11. The system of claim 10, wherein the first sensor and the second sensor are universal heated exhaust gas oxygen (UHEGO) sensors.

12. The system of claim 10, wherein the lambda condition is satisfied when one of the first lambda value and the second lambda value indicates that an air-fuel ratio of the exhaust gas is equal a stoichiometric air-fuel ratio.

13. The system of claim 10, wherein:
the lambda condition is satisfied between a first time and a second time;
the second time is subsequent to the first time;
the first lambda value is equal to a predefined lambda value at the first time; and
the second lambda value is equal to the predefined lambda value at the second time.

14. The system of claim 10, wherein the instructions further comprise:
setting the exhaust gas to one of a rich state and a lean state; and
determining, based on the sensor data received from at least one of the first sensor and the second sensor, whether the lambda value of the exhaust gas flowing through the exhaust aftertreatment system satisfies the lambda condition in response to setting the exhaust gas to one of the rich state and the lean state.

15. The system of claim 10, wherein the instructions further comprise:
obtaining a plurality of impedance values of the electrically heated catalyst; and
determining an impedance gradient of the electrically heated catalyst based on the plurality of impedance values and the oxygen storage capacity.

16. The system of claim 15, wherein the instructions further comprise:
determining a temperature gradient of the electrically heated catalyst based on the impedance gradient; and
correlating the temperature gradient to a degradation value from a plurality of degradation values.

17. The system of claim 10, wherein the instructions for obtaining the impedance value of the electrically heated catalyst in response to providing the electric power further comprises:
obtaining an impedance value from an impedance detection circuit in response to providing the electric power, wherein the impedance detection circuit is electrically coupled to the electrically heated catalyst; and
determining the impedance value of the electrically heated catalyst based on the impedance value of the impedance detection circuit.

18. The system of claim 10, wherein the instructions for providing the electric power to the electrically heated catalyst further comprises selectively activating one or more switches of a switching circuit, wherein the switching circuit electrically couples the electrically heated catalyst and a power supply.

* * * * *